United States Patent
Mecikalski (10) Patent No.: US 11,353,625 B1
(45) Date of Patent: Jun. 7, 2022

(54) SYSTEMS AND METHODS FOR FORECASTING LIGHTNING AND SEVERE STORMS

(71) Applicant: John R. Mecikalski, Madison, AL (US)

(72) Inventor: John R. Mecikalski, Madison, AL (US)

(73) Assignee: BOARD OF TRUSTEES OF THE UNIVERSITY OF ALABAMA, FOR AND ON BEHALF OF THE UNIVERSITY OF ALABAMA IN HUNTSVILLE, Huntsville, AL (US)

( * ) Notice: Subject to any disclaimer, the term of this patent is extended or adjusted under 35 U.S.C. 154(b) by 120 days.

(21) Appl. No.: 16/987,268

(22) Filed: Aug. 6, 2020

Related U.S. Application Data (63) Continuation of application No. 15/092,988, filed on Apr. 7, 2016, now Pat. No. 10,761,242.

(60) Provisional application No. 62/259,147, filed on Nov. 24, 2015.

(51) Int. Cl.
    *G01W 1/16* (2006.01)
    *G01W 1/10* (2006.01)

(52) U.S. Cl.
    CPC .............. *G01W 1/16* (2013.01); *G01W 1/10* (2013.01)

(58) Field of Classification Search
    CPC ................................. G01W 1/10; G01W 1/16
    USPC ............................................................ 702/4
    See application file for complete search history.

(56) References Cited

U.S. PATENT DOCUMENTS

| | | | |
|---|---|---|---|
| 7,403,854 B1 | 7/2008 | Hurley | |
| 8,818,029 B1 | 8/2014 | Mecikalski | |
| 2004/0043760 A1* | 3/2004 | Rosenfeld | H04L 67/16 455/414.3 |
| 2011/0282514 A1* | 11/2011 | Ropp | H02J 3/383 700/297 |
| 2016/0104059 A1* | 4/2016 | Wang | G06V 20/13 382/103 |

OTHER PUBLICATIONS

Mecikalski, U.S. Appl. No. 15/092,988, entitled, "Systems and Methods for Forecasting Lightning and Severe Storms," filed Apr. 7, 2016.

* cited by examiner

*Primary Examiner* — Dzung Tran
(74) *Attorney, Agent, or Firm* — Maynard Cooper & Gale, P. C.; Jon E. Holland (57) ABSTRACT

A weather forecasting system has weather forecasting logic that receives weather data from a satellite or other source, such as radar. The weather forecasting logic processes such data to identify cumulus clouds. For each cumulus cloud identified, the weather forecasting logic applies interest field tests and feeds the results into formulas derived based on measurements from current and past weather events. The model determines a score indicating the likelihood of the cumulus cloud forming precipitation and a score indicating the likelihood of the cumulus cloud forming lightning in the future within a certain time period. Based on such scores, the weather forecasting logic predicts in which geographic regions the identified cumulus cloud will produce precipitation and/or lightning during the time period. The predictions of the weather forecasting logic may then be used to provide a weather map thereby providing users with a graphical illustration of the areas.

12 Claims, 4 Drawing Sheets

SYSTEMS AND METHODS FOR FORECASTING LIGHTNING AND SEVERE STORMS

CROSS REFERENCE TO RELATED APPLICATION

This application is a continuation of and claims priority to U.S. patent application Ser. No. 15/092,988, entitled "Systems and Methods for Forecasting Lightning and Severe Storms" and filed on Apr. 7, 2016, which is incorporated herein by reference. U.S. patent application Ser. No. 15/092,988 claims priority to U.S. Provisional Application No. 62/259,147, entitled "Systems and Methods for Forecasting Lightning and Severe Storms" and filed on Nov. 24, 2015, which is incorporated herein by reference.

STATEMENT REGARDING FEDERALLY SPONSORED RESEARCH OR DEVELOPMENT

This invention was made with Government support under ATM-0813603 awarded by the National Science Foundation. The Government has certain rights in the invention.

RELATED ART

Advances in weather forecasting enable meteorologists to provide more accurate forecasts and earlier warnings of significant weather events, such as tornadoes and severe storms and related hazards (e.g., high winds, large hail, flooding rains, etc.). Unfortunately, accurate weather forecasting remains an inherently difficult process, especially in the 0-6 hour timeframe (so-called "nowcasting"), and even better forecasting techniques are generally desired to enhance accuracy and provide even earlier warnings in advance of significant weather events.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to weather forecasting systems and methods. In one exemplary embodiment, a data processing system 22 receives raw image data from a satellite, and weather forecasting logic processes such data to identify cumulus clouds within the satellite images. The weather forecasting logic accesses real-time data for each identified cumulus cloud and applies interest field tests in order to determine a probability that the cumulus cloud will produce lightning during a certain time period in the future and/or a likely severity that the cumulus cloud will produce a severe storm as defined by related hazards, such as for example winds greater than or equal to 25 $ms^{-1}$ (or some other threshold), hail greater than or equal to 2.5 cm in diameter (or some other threshold), and/or tornadoes. In this regard, the weather forecasting logic inputs the results of each interest field test into weighted formulas generated by applying machine learning techniques to historical weather data. The weather forecasting logic determines a score indicating the probability that or extent to which the cumulus cloud will form precipitation in the future within a certain time period (e.g., within the next 1 hour or some other unit of time). The weather forecasting logic also determines a score that indicates the probability that or extent to which the cloud will produce lightning during the time period. The predictions of the weather forecasting logic may then be used to provide a probabilistic weather map, thereby providing users with a graphical illustration of the areas predicted to be affected by precipitation and lightning within the time period.

Figure 1:
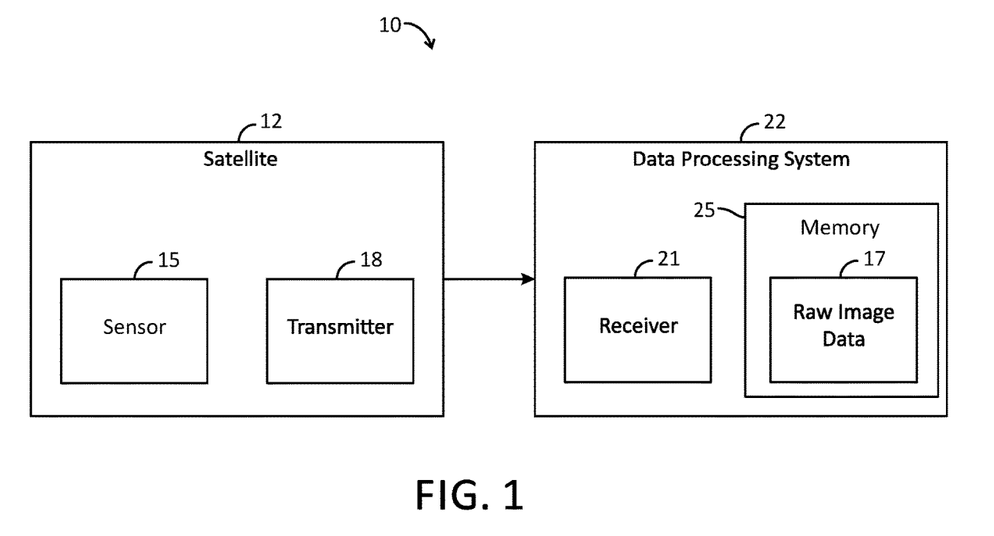
FIG. 1 is a block diagram illustrating an exemplary embodiment of a weather forecasting system.

FIG. 1 depicts an exemplary embodiment of a weather forecasting system 10. The system 10 comprises a satellite 12 that orbits the Earth. In one exemplary embodiment, the satellite is a Geostationary Operational Environment Satellite (GOES), though other types of satellites may be used in other embodiments. As shown by FIG. 1, the satellite 12 comprises at least one sensor 15 for detecting light or other energy from the Earth (e.g., sunlight reflected from the terrain, clouds, and other objects). Light and thermal energy measured by the sensor 15 is used to form data 17, referred to herein as "raw satellite image data" or simply "raw image data," which is wirelessly transmitted from a transmitter 18 to a receiver 21 of a data processing system 22 located on Earth, as shown by block 101 of FIG. 4. As shown by FIG. 1, the data processing system 22 has memory 25 for storing the raw image data 17 received from the satellite 12.

Each frame of raw image data 17 has a plurality of pixels in which each pixel represents a respective geographic region. As an example, as will be described in more detail hereafter, each pixel might represent a 1 kilometer (km)-by-1 km region of the Earth or a region of some other size. Each pixel has a value indicative of the visible light or infrared radiance detected from the geographic region associated with the pixel. As an example, in one exemplary embodiment, the pixel value for visible light is measured by the reflectivity of the light from objects (e.g., clouds, terrain, etc.) that are viewable by the satellite 12 within the associated geographic region. In addition, for infrared wavelengths, the pixel value is converted from raw radiance into a temperature value. In this regard, the temperature value represents the approximate temperature of the illuminated objects (e.g., clouds, terrain, etc.) that are viewable by the satellite 12 within the associated region. Other types of pixel values are possible in other embodiments.

The satellite 12 may have multiple sensors 15 for sensing multiple image frames for different wavelengths of light. Exemplary techniques for sensing wavelengths of light and image frames are discussed in detail in the commonly-assigned U.S. Pat. No. 8,818,029, entitled "Weather Forecasting Systems and Methods" and filed on May 27, 2011, which is incorporated herein by reference. In the instant embodiment, for the raw image data captured by the satellite 12, each pixel of the frame for visible light represents a 1 km-by-1 km geographic region (i.e., has a 1 km resolution), and the frames for infrared radiance have a 4 km resolution.

In other embodiments, other wavelengths and resolutions are possible, and each sample may have any number of image frames.

Figure 2:
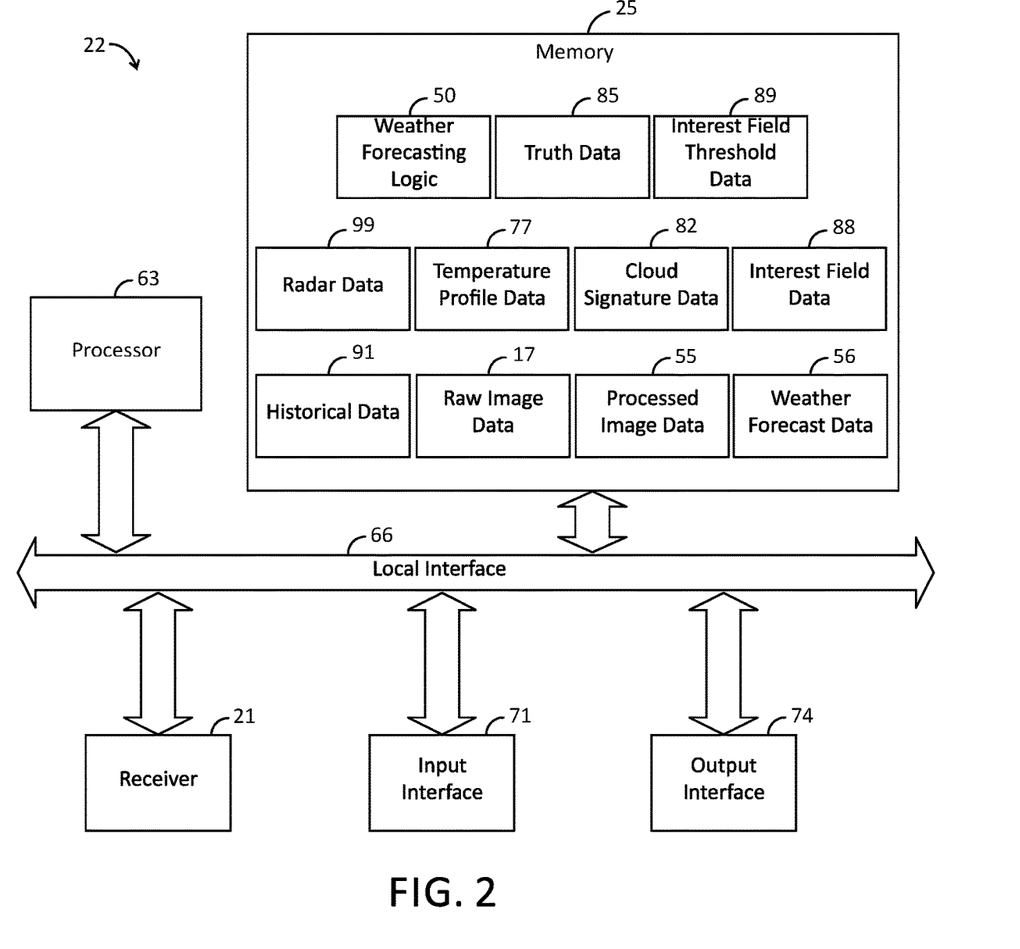
FIG. 2 depicts an exemplary embodiment of a data processing system of a weather forecasting system, such as is depicted by FIG. 1.

FIG. 2 depicts an exemplary embodiment of the data processing system 22. As shown by FIG. 2, the data processing system 22 has weather forecasting logic 50 that is configured to use the raw image data 17 to form processed satellite image data 55, which is used by the logic 50 to form weather forecast data 56, as will be described in more detail hereafter. It should be noted that the weather forecasting logic 50 can be implemented in software, hardware (e.g., logic gates), firmware, or any combination thereof. In the exemplary embodiment illustrated in FIG. 2, the weather forecasting logic 50 is implemented in software and stored in the memory 25 of the data processing system 22.

Note that the weather forecasting logic 50, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

The exemplary embodiment of the data processing system 22 depicted by FIG. 2 comprises at least one conventional processor 63, such as a digital signal processor (DSP) or a central processing unit (CPU), that communicates to and drives the other elements within the system 22 via a local interface 66, which can include at least one bus. As an example, when the weather forecasting logic 50 is implemented in software, the processor 50 may be retrieve instructions of the weather forecasting logic 50 from memory 25 and execute such instructions. That is, the processor 63 may be programmed with instructions from the weather forecasting logic 50 in order to implement the functionality described herein for the logic 50. Furthermore, an input interface 71, for example, a keyboard, keypad, or a mouse, can be used to input data from a user of the system 22, and an output interface 74, for example, a printer or a display device, e.g., a liquid crystal display (LCD), can be used to output data to the user.

In one exemplary embodiment, the satellite image samples are taken at a rate of about 4 per hour, although other sample rates are possible in other embodiments. That is, approximately every 15 minutes or other time period, the satellite 12 captures five frames of raw satellite image data 17 (defining a weather "sample") and wirelessly transmits such frames to the data processing system 22. Each wavelength range measured by the satellite 12 shall be referred to herein as a "channel." The frames for a given sample include a frame for visible light, a frame for infrared radiance at a wavelength of 3.9 μm, a frame for infrared radiance at a wavelength of 6.5 μm, a frame for infrared radiance at a wavelength of 10.7 μm, and a frame for infrared radiance at a wavelength of 13.3 μm. In other embodiments, a sample may include other numbers of frames or channels, as well as other wavelengths.

The weather forecasting logic 50 is configured to process the raw satellite image data 17 to provide the processed satellite image data 55, which may be referred to simply as "processed image data." In this regard, the weather forecasting logic 50 analyzes multiple samples of the raw image data 17 over time to determine various information indicating favorable factors for convection, (e.g., moisture fields, temperature fields, and wind vector fields likely to lead to the formation of cumulus clouds) and lightning strikes (e.g., electrical charging). In an exemplary embodiment, the weather forecasting logic 50 identifies wind vectors indicative of wind speed and direction at various altitudes within the Earth's atmosphere, and such wind vectors are stored in the memory 25 as part of the processed image data 55. In particular, the weather forecasting logic 50 identifies cumulus cloud objects representing cumulus clouds within the samples of raw image data 17 and tracks the movement of such cloud objects over multiple samples to determine the speed and direction of the cloud objects and, therefore, the clouds represented by them. A cloud object may be identified from one sample to the next based on the cloud size and shape represented by the object, as well as an approximate geographic location indicated for the cloud object, considering the size and shapes of clouds generally do not change rapidly. In this regard, a cloud object in one sample is likely to have the same or similar cloud size and shape in the next successive sample. In addition, the geographic location for the cloud object is likely to be close to the same geographic region in two successive samples, though any difference in its geographic location is indicative of its velocity.

Note that the weather forecasting logic 50 uses temperature profile data 77 to determine the altitude of a cloud represented by a cloud object. In this regard, the temperature profile data 77 indicates the temperature profile of the atmosphere. That is, such data 77 indicates the temperature of various altitudes of various geographic regions. Thus, such data 77 can be analyzed to determine the approximate temperature at a certain altitude of a certain geographic region.

Based on the raw image data 17 from the infrared channels, the weather forecasting logic 50 determines the temperature of the cloud tops of the clouds represented by the cloud objects, and the logic 50 may use such temperature information for wind vectoring. In this regard, for each cloud object, the weather forecasting logic 50 may use the cloud top temperature to look up in or otherwise determine from the temperature profile data 77 the altitude having the same temperature within the same geographic region as the cloud represented by the cloud object. The weather forecasting logic 50 assumes that the cloud top of the identified cloud is at such altitude and, thus, assigns to the wind vector derived from such cloud the altitude of the cloud top. Using such techniques for a plurality of clouds, the weather forecasting logic 50 determines the wind vectors at various altitudes in various geographic regions. Using such wind vectors, the weather forecasting logic 50 can predict future movements of the cloud objects and, therefore, the clouds in order to determine the respective geographic region across which each identified cloud is likely to pass within a certain time period in the future, as will be described in more detail hereafter.

The weather forecasting logic 50 also analyzes the raw image data 17 to identify cumulus clouds within the images defined by such data 17. Note that cumulus clouds are the seeds for thunderstorms and precipitation. As cumulus clouds grow and evolve, depending on various meteorological conditions, they can develop into thunderstorms. As described in further detail in the commonly assigned U.S. Pat. No. 8,818,029, the weather forecasting logic 50 identifies cumulus clouds and tracks the identified cumulus clouds over time. The logic 50 also identifies the geographic region shown by the raw image data 17 for each identified cumulus cloud. The logic 50 applies various interest field checks to assess which of the cumulus clouds have attributes that indicate they will likely cause precipitation, lightning, or other hazardous weather associated with thunderstorms (e.g., hail, high winds, tornadoes, etc.) within a certain time period, such as within the next 1 hour or some other unit of time, and where that precipitation or lightning likely will occur based on the geographic features of the surrounding region.

In one exemplary embodiment, the logic 50 tracks cumulus clouds for up to about 30 minutes for each sample, but other times are possible in other embodiments. The logic 50 also identifies the geographic regions shown in each sample. The logic 50 then uses such information, along with the wind vectors described above, and information measured during previous weather events in the same geographic region to forecast which geographic regions will likely experience precipitation and/or lightning in the near future. The weather forecasting logic 50 may use attributes of cumulus clouds identified in the raw image data 17, measurements of actual lightning strikes and precipitation, and attributes of previous weather events for each geographic region within the raw image data 17 in order to predict where precipitation or lightning will likely occur in the future. In general, attempts to predict future occurrences of precipitation, lightning and/or other weather events within 0-6 hour timeframes, based on current and/or past weather conditions, are referred to as "nowcasting."

There are various techniques that can be used to identify cumulus clouds within the raw image data 17. In one exemplary embodiment, the raw image data 17 is compared to predefined cloud signature data 82 that is stored in memory 25. In this regard, cumulus clouds have certain light-based and infrared-based signatures that are unique relative to other types of clouds. In particular, if a cloud is cumulus, it is expected that light reflected and radiance emitted from it will have certain attributes. That is, the values of the visible light channel and the infrared radiance channels are expected to be within certain ranges as defined by the cloud signature data 82, which may be empirically determined. Thus, to identify whether a particular pixel is indicative of at least a portion of a cumulus cloud, the weather forecasting logic 50 compares the pixel values of the wavelength channels for the same geographic region to the respective ranges defined by the cloud signature data 82. Depending on whether each pixel value is within its respective range, the logic 50 can make a determination whether the pixel indicates at least a portion of a cumulus cloud. If so, the logic 50 marks the pixel as a cumulus cloud pixel.

Exemplary techniques for analyzing raw image data 17 to identify cloud temperatures for wind vectoring and cumulus clouds are discussed in detail in the commonly assigned U.S. Pat. No. 8,818,029. In one embodiment, the logic 50 identifies and marks pixels of raw image data 17 that are indicative of a cumulus cloud, then clusters contiguous cumulus cloud pixels into a "cumulus cloud object." The logic 50 stores each cumulus cloud object in memory 25 as part of processed image data 55, and analyzes the pixels of the cumulus cloud objects to determine whether the cumulus cloud represented by that object will likely produce precipitation or lightning in the future within a certain time period.

In the instant embodiment, the logic 50 is further configured to analyze raw image data 17 to identify cumulus cloud objects visible within each frame that demonstrate observable characteristics of electrical charging. Note that electrical charging within a cloud is indicative that the cloud will produce lightning in the future. In this regard, glaciation of a cloud's top occurs contemporaneously with the electrical charging process within a cloud that will later produce lightning. In the context of this document, "glaciation" refers to a change of phase of particles in a cloud from primarily liquid water-dominated hydrometeors (i.e., water droplets) to ice crystals. Such glaciation results in a decrease in observable infrared reflectance as measured by the sensor 15 as compared with a level of infrared reflectance observable in a cloud where glaciation is not occurring. It has been observed that while liquid water-dominated hydrometeors within a cloud reflect infrared light emitted by the sensor 15 at a higher level than do ice crystals within a cloud, which scatter infrared light. Thus, ice crystals reflect infrared light emitted by the sensor 15 at a lower level than do liquid water-dominated hydrometeors, which is observable in the raw image data 17.

As will be described in more detail herein, the logic 50 is configured to determine interest fields based on the satellite image data 17 and weather data (e.g., radar data 99), as shown by block 107 of FIG. 4, and to apply one or more of such interest fields to each cumulus cloud object visible in each frame in order to determine whether the cumulus cloud represented by each cumulus cloud object is likely to produce precipitation and/or lightning in the future within a certain time period. In the context of this document, an "interest field" is a field of data that (1) has been calculated or otherwise determined based on the pixel values or other values of satellite imagery data, such as the processed image data 55, or based on other weather data and (2) is indicative of whether a geographic region is likely to experience precipitation, lightning, and/or other weather events in the future within a certain time period. There are many types of interest fields that might be calculated by the logic 50, and such interest fields are stored in the memory 25 as interest field data 88.

Each interest field has a respective threshold stored in memory 25 as interest field threshold data 89, which is determined a priori. A comparison of the interest field value to its respective threshold is indicative of whether an associated cumulus cloud is likely to produce precipitation, lightning, and/or other weather event (e.g., hail, high winds, tornadoes, etc.) within a certain time period, such as within the next 1 hour or some other unit of time. In one exemplary embodiment, the logic 50 calculates two scores based on a comparison of interest field data 88 with interest field threshold data 89: a "convective initiation score" and "lightning initiation score," as will be further described below.

Note that it is possible for an interest field to indicate a trend in a weather parameter or, in other words, to indicate how the weather parameter changes over time. As an example, the logic 50 may be configured to note changes in infrared radiance reflected by each cloud detected in raw image data 17 between each successive sample in order to predict lightning initiation for the cloud. Based on the raw image data 17 from the infrared channels, the logic 50 determines a level of infrared radiance reflected by a cloud in one sample of raw image data 17 and compares it with a level of infrared radiance reflected by the same cloud in the next subsequent sample of raw image data 17 to define a value of an interest field. The logic 50 compares this interest field value, which represents the difference between the level of radiance reflected by the cloud over time (e.g., for multiple samples), with a predefined threshold stored in memory 25 as interest field threshold data 89. If the difference between such radiance levels is indicative of a decrease in reflected radiance which exceeds the predefined threshold, the logic 50 is configured to determine that glaciation that is indicative of electrical charging is occurring within the cloud such that the cloud will likely produce lightning in the near future. In the instant embodiment, the logic 50 is configured to perform this comparison for a plurality of identified cumulus clouds until all such clouds in raw image data 17 have been analyzed. The logic 50 is configured to store data that is indicative of the results of each such comparison for each cloud in interest field data 88.

In an exemplary embodiment, for each cumulus cloud identified in raw image data 17, data that is indicative of actual precipitation and lightning strikes produced by each cloud, such as data detected via radar (not shown), data detected via lightning mapper arrays (not shown), and data from algorithms using such detected data, is stored in memory 25 as truth data 85. In one embodiment, truth data 85 comprises data generated via radar that is indicative of a size and type of precipitation occurring in each cloud. Note that in the instant embodiment, such data is generated via radar (not shown), but other techniques may be used to generate the data in other embodiments. Additionally, truth data 85 further comprises data that is indicative of a location (i.e., geographic area or cloud-to-cloud) where each lightning flash occurs. In this regard, such data is generated via a lightning mapping array (not shown), but other techniques may be used to generate the data in other embodiments (e.g., via a GOES-R proxy geostationary lightning mapper). For example, in one embodiment, the sensor 15 comprises a GOES-R proxy geostationary lightning mapping device that is configured to generate data indicative of actual lightning strikes in each sample of raw image data 17. Truth data 85 further comprises data indicative of lightning intensity (i.e., flash rates) derived from algorithms (e.g., the weather research and forecast and lightning forecast algorithm models). In this regard, the logic 50 is configured to store such information in truth data 85 and use it in addition to other information stored in truth data 85 generated by radar when deriving a lightning initiation formula and score, as further described below.

Figure 4:
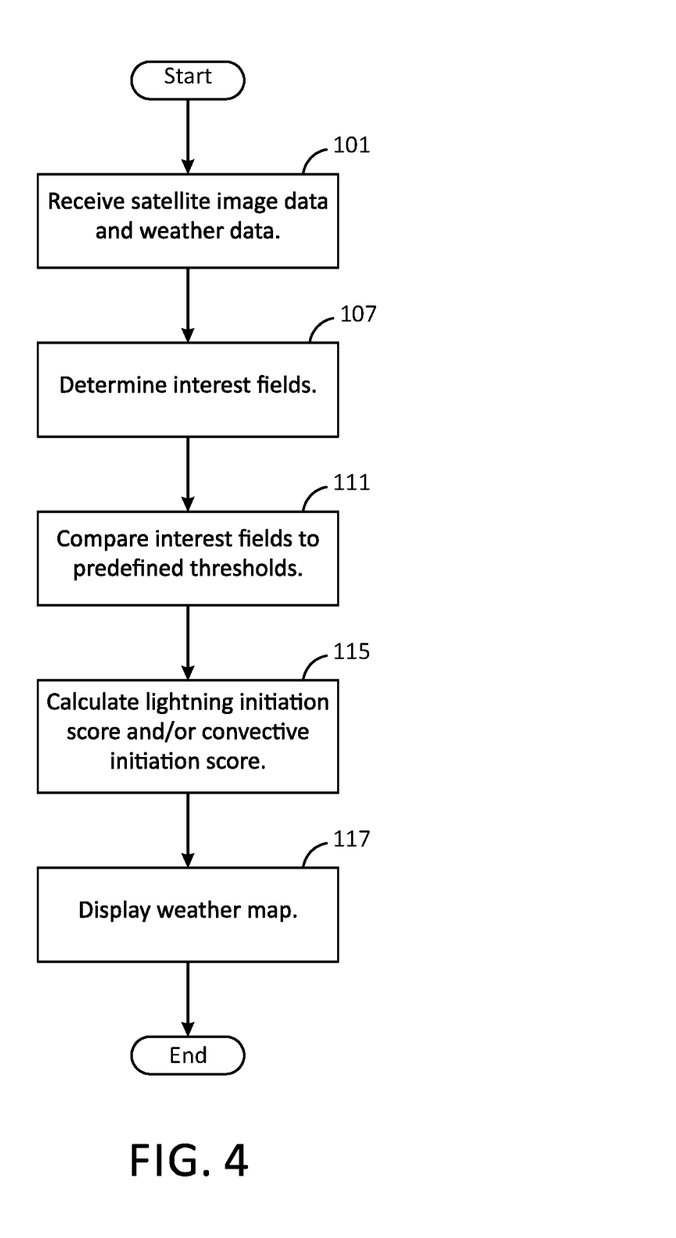
FIG. 4 is a flow chart illustrating an exemplary method for forecasting lightning and/or convective storms.

For each cumulus cloud object, the logic 50 calculates a score, referred to hereafter as "convective initiation score," based on comparisons of selected interest field data 88 to the interest field threshold data 89, as shown by blocks 111 and 115 of FIG. 4. In this regard, for each sample, the logic 50 initializes the convective initiation score to zero (0) and increases (e.g., increments) the convective initiation score for each interest field value that exceeds its associated threshold value. Thus, the convective initiation score may be essentially a count of the number of interest field values that exceed their associated interest field threshold values. In other embodiments, different weighting may be applied to one or more interest fields to order to increase or decrease the effect of the interest field to the overall score relative to other interest fields that may be weighted differently. Note that when calculating a convective initiation score, the logic 50 may use the same or different interest fields as the logic 50 uses to calculate a lightning initiation score, as described below. In one exemplary embodiment, the interest field thresholds are selected, based on empirical data, such that a higher convective initiation score means that it is more likely that the cumulus cloud represented by the cumulus cloud object will produce precipitation within a certain time period. Moreover, the logic 50 compares the convective initiation score to a predefined threshold, referred hereafter as the "convective initiation threshold." If such threshold is exceeded, the weather forecasting logic 50 determines that the cumulus cloud represented by the cumulus cloud object is likely to produce precipitation during a certain time period, such as within 1 hour from the time of the sample or some other unit of time. The convective initiation score may also be an indicator indicating the likely severity of precipitation that will occur for the cloud during the time period. The logic 50 performs the aforementioned process for each cumulus cloud object of a sample in order to determine which cumulus cloud objects represent cumulus clouds that are likely to produce precipitation within the time period.

Similarly, the logic 50 calculates a "lightning initiation score" based on comparisons of the interest field data 88 to the interest field threshold data 89, as shown by blocks 111 and 115 of FIG. 4. In this regard, for each sample, the logic 50 initializes the lightning initiation score to zero (0) and increases (e.g., increments) the lightning initiation score for each interest field value that exceeds its associated threshold value. Thus, the lightning initiation score may be essentially a count of the number of interest field values that exceed their associated interest field threshold values. In other embodiments, different weighting may be applied to one or more interest fields in order to increase or decrease the effect of the interest field to the overall score relative to other interest fields that may be weighted differently. In one exemplary embodiment, the interest field thresholds are selected, based on empirical data, such that a higher lightning initiation score means that it is more likely that the cumulus cloud represented by the cumulus cloud object will produce lightning within a certain time period and that such lightning will be more intense. In this regard, the lightning initiation score is not simply an indicator of the probability that lightning will occur, but also an indicator of how intense the lightning associated with each cumulus cloud will be (i.e., its flash rate). Moreover, the logic 50 compares the lightning initiation score to a predefined threshold, referred to hereafter as the "lightning initiation threshold." If such threshold is exceeded, the weather forecasting logic 50 determines that the cumulus cloud represented by the cumulus cloud object is likely to produce lightning during a certain time period, such as within 1 hour from the time of the sample or some other unit of time. The logic 50 performs the aforementioned process for each cumulus cloud object of a sample in order to determine which cumulus cloud objects represent cumulus clouds that are likely to produce lightning within the time period.

Note that the lightning initiation score (as well as other scores determined by the weather forecasting logic 50) may be based on any number of interest fields as may be desired, including raw weather measurements, available weather forecasts, interest field trends, and other information. Also, the interest fields used to calculate the lightning initiation score (or other score) may be weighted in any desired manner in order to increase the relevance of at least some interest fields relative to other interest fields. In one embodiment, the weather forecasting logic 50 uses interest fields derived from at least both satellite images (e.g., processed image data 55) and radar data 99 as will be described in more detail hereafter.

As known in the art, radar data 99 generally indicates the amount or intensity of precipitation measured by a radar system occurring in a geographic region monitored by the radar system. For each of a plurality of sub-regions, the radar data 99 may include at least one value indicating an intensity of precipitation measured for the sub-region. In many cases, each sub-region includes a plurality of values respectively associated with different altitudes. Each such value, referred to herein as "radar value," indicates the intensity of precipitation measured at the corresponding altitude in the respective sub-region. Thus, by analyzing the radar data 99, it is possible to determine the intensity of precipitation that is occurring or has been measured to occur during a particular time period at various altitudes within a certain geographic region of interest.

In one embodiment, the weather forecasting logic 99 is configured to analyze the radar data 99 for each identified cumulus cloud object in order to determine an amount or intensity of precipitation measured at a certain altitude within the cloud represented by the object and to use such value to calculate the lightning initiation score or other type of value. As an example, the weather forecasting logic 99 may use a value, referred to as hereafter as "high-altitude radar value," indicative of an intensity of the measured precipitation at an altitude at or below freezing, such as the altitude at or close to the −10° Celsius (C) level. In this regard, a significant precipitation measurement at such altitude generally indicates that significant volumes of supercooled water and ice are present in a strong updraft. Such condition is conducive to charge separation in the cloud which often leads to an occurrence of lightning. Accordingly, an interest field based on the high-altitude radar value is generally indicative of lightning. That is, a higher measurement of precipitation intensity at the −10° C. level generally indicates a greater likelihood that lightning will occur in the near future, such as in the next fifteen minutes or so. By using the high-altitude radar value or other similar measurement as at least a factor in calculating the lightning initiation score, the accuracy of such score can be increased.

Note that there are various ways that the high-altitude radar value can be used by the weather forecasting logic 50. As an example, the high-altitude radar value associated with a cloud can be used an input variable to a regression equation for calculating the lightning initiation score. In another embodiment, the weather forecasting logic 50 may be configured to calculate a lightning initiation score using a regression equation where various interest fields from satellite images or other sources are used as input variables. In this regard, the input variables may be based on satellite images, radar data, ground observations, forecast models of lightning or other weather events, or other types of weather data. U.S. Provisional Application No. 62/236,224, entitled "Weather Forecasting Systems and Methods" and filed on Oct. 2, 2015, which is incorporated herein by reference, describes a forecasting system that calculates various scores for weather forecasting. Such information is also described by U.S. application Ser. No. 15/082,744, entitled "Systems and Methods for Forecasting Weather Based on Numerical Weather Prediction Model Data" and filed on Mar. 28, 2016, which is incorporated herein by reference. Any of the interest fields or scores described in U.S. Provisional Application No. 62/236,224 and U.S. application Ser. No. 15/082,744 may be used as an input variable to a regression equation for calculating the lightning initiation score or other score described herein.

As described above, a lightning initiation score associated with a cloud object may be indicative of whether the cloud represented by such object will produce lightning and/or an extent to which the cloud is likely to produce lightning during a given time period, such as approximately the next 45 minutes, for example. In one embodiment, the high-altitude radar value is used to control the confidence of the lightning initiation score during the same or different period, such as the next 15 minutes, for example. Thus, in one embodiment, the logic 50 is configured to calculate a lightning initiation score using satellite information or other weather data indicating a probability or intensity of lightning that will be produced by a cloud during the next 45 minutes or other time period. Subsequently, if the high-altitude radar value for the same cloud object exceeds a predefined threshold, the weather forecasting logic 50 is configured to increase a confidence associated with the lightning initiation score.

In addition, in one embodiment, the weather forecasting logic 50 is configured to predict whether a cloud represented by an identified cloud object is likely to produce lightning within a certain time period based on both (1) the satellite or regression lightning initiation score and (2) the high-altitude radar value associated with the cloud object. For example, if the lightning initiation score exceeds a certain threshold indicating that conditions in or around the cloud are conducive for lightning over a time period (e.g., the next 45 minutes or so) and if the high-altitude radar value exceeds another threshold indicating that a strong updraft is likely forcing a mixture of supercooled water and ice to high altitudes within the cloud, the weather forecasting logic 50 may predict that lightning will occur during a certain time period (e.g., the next fifteen minutes or some other time period), referred to as the "prediction period," in the geographic region through or over which the cloud is expected to pass during the prediction period. However, if the satellite or regression lightning initiation score or the high-altitude radar value is too low, the weather forecasting logic 50 might determine that it is unlikely that the cloud will produce lightning during the prediction period. In other embodiments other techniques for using the high-altitude radar value in weather forecasting are possible.

Based on such determinations, the logic 50 updates the weather forecast data 56 according to the predictions of which cumulus clouds will likely produce precipitation and/or lightning during the defined time period. In this regard, each pixel of the weather forecast data 56 represents a different geographic region and has two values: a "convective initiation indicator" indicating whether (e.g., probability that) such geographic region is expected to receive precipitation and a "lightning initiation indicator" indicating whether (e.g., probability that) such geographic region is expected to receive lightning during the defined time period. Note that each pixel's convective initiation indicator may be determined by (e.g., equal to) the convective initiation score calculated by the logic 50 for the cloud associated with the pixel, and each pixel's lightning initiation indicator may be determined by (e.g., equal to) the lightning initiation score calculated by the logic 50 for the cloud associated with the pixel. For each cumulus cloud object generating a convective initiation score and/or lightning initiation score above the respective convective initiation and lightning initiation thresholds, the logic 50 is configured to determine an expected path of the cloud represented by such object based on such information as well as the cloud's current position and the wind vectors indicated by the processed image data 55, but the logic 50 may make such determination based on other information in other embodiments. The pixels of the weather forecast data 56 that are representative of the locations within such path during the defined time period are updated to indicate precipitation and the occurrence of lightning (e.g., a thunderstorm). Thus, when the weather forecast data 56 is displayed, the weather map defined by such data 56 will indicate that such geographic location will likely experience precipitation and/or lightning during the defined time period. As shown by block 117 of FIG. 4, the forecast weather data 56 may be displayed or otherwise output via the output interface 74 or other output interface. As an example, the data 56 may be transmitted to a remote location by one or more networks and displayed or otherwise output by an output interface (e.g., a display of smartphone or other type of computing device) at the remote location.

Figure 3:
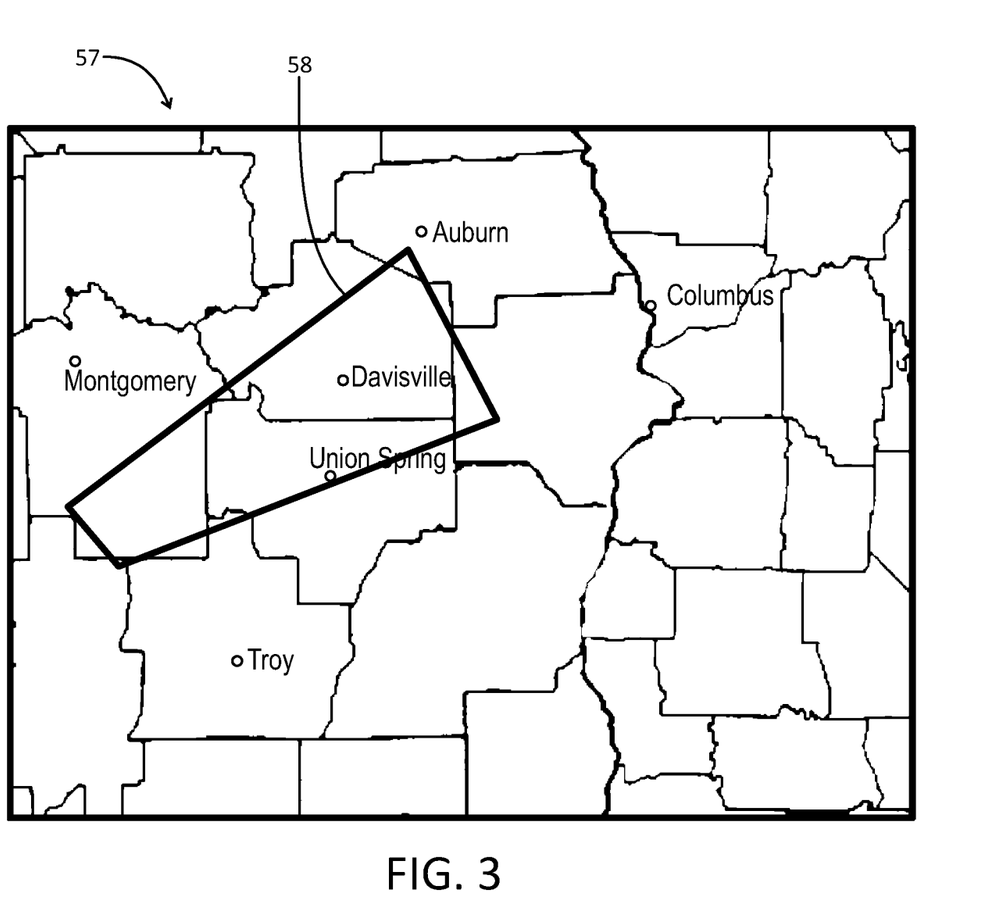
FIG. 3 depicts an exemplary weather map that may be displayed by a weather forecasting system, such as is depicted by FIG. 1.

FIG. 3 depicts an exemplary weather map 57 that may be displayed. The map 57 includes at least one graphical element 58, such as a polygon, displayed over a portion of the map 57 representing a geographic region. The graphical element 57 defines a boundary for a geographic area in which lightning or other weather event, such as convective storm, is predicted to occur. As an example, the graphical element 57 may define a boundary for contiguous pixels representing sub-regions within a predicted path of one more clouds associated with a lightning initiation score or a convective initiation score above a predefined threshold within a certain time period in the future.

There are various types of interest fields on which weather event predictions can be made. In one exemplary embodiment, weather data (e.g., satellite image data or weather radar data) pertaining to actual weather events, such as precipitation, is empirically analyzed to identify various signatures exhibited by cumulus clouds that produce precipitation and geographic regions where cumulus clouds form. Such data is also analyzed to identify signatures exhibited by cumulus clouds that produce lightning. The identified signatures are then used to define the interest fields and interest field thresholds that are to be used by the logic 50.

As an example, it has been observed that the rate at which a cumulus cloud grows is indicative of whether the cumulus cloud is likely to turn into a thunderstorm and/or produce precipitation. In particular, rapidly growing cumulus clouds with strong updrafts and large cloud depths are more likely to produce precipitation in the near future relative to clouds that are diminishing or growing at a slow pace. Clouds rapidly growing into thunderstorms often have glaciation or significant amounts of frozen cloud drops and precipitation particles at and near cloud top. The interest fields are defined so that they indicate attributes pertaining to cloud growth, updraft strength, rate of growth, overshooting cloud tops, glaciation, and/or other indicators of thunderstorms, precipitation, and lightning.

In one exemplary embodiment, the logic 50 is configured to identify within a cumulus cloud object the pixel, referred to hereafter as the object's "coldest pixel," having the lowest temperature value representing the area of the cumulus cloud that is the coldest. Such area likely has the strongest updraft. The logic 50 compares the reflectivity and/or infrared values of the coldest pixel for cumulus cloud objects representing the same cumulus cloud in multiple samples in order to determine whether such cumulus cloud is likely to produce precipitation and/or lightning. As an example, to define one interest field, the logic 50 might compare the pixel value of the coldest pixel for an infrared channel (e.g., 6.5 μm channel) in the last sample with the pixel value of the coldest pixel for the same cloud for the same infrared channel in the penultimate sample. The difference between such two pixel values indicates the rate of change of cloud's strongest updraft. In this regard, the greater the difference, the more likely it is that the cumulus cloud is developing into a thunderstorm that will produce precipitation in the near future. If the difference exceeds a predefined threshold for the interest field, then the logic 50 increments or otherwise changes the convective initiation score such that the convective initiation score takes into account the rapidly growing updraft strength.

Note that, as briefly described above, the interest field inputs used to generate the convective initiation score and the lightning initiation score described above may be weighted based on historical weather data 91 in order to emphasize some interest fields over others in the prediction process. For example, if one interest field is a more reliable or otherwise better predictor of precipitation, the convective initiation score may be increased by a value greater than one if the value of the interest field exceeds its corresponding threshold while the convective initiation score may be increased by a value of one or less if the value of another interest field exceeds its corresponding threshold. Similarly, the lightning initiation score may be increased by a value greater than one if a more reliable interest field exceeds its corresponding threshold, while other interest fields may be increased by a value less than one if such interest fields exceed their predefined thresholds.

In an exemplary embodiment, the logic 50 is configured to derive both convective initiation and lightning initiation formulas that account for past weather events for a region as well as current data indicative of measurements of precipitation and lightning a cumulus clouds has produced in other regions. The logic 50 applies machine learning techniques to determine each interest field's weight based on measurements from current weather events (i.e., cumulus clouds visible in raw image data 17) stored in memory 25 as truth data 85 and the same measurements from past weather events in the same geographic region stored in memory 25 as historical data 91. In the context of this document, "machine learning" refers to neural network or machine learning computing techniques using algorithms such as the random forest algorithm. Note that other neural network or machine learning computing techniques may be used in other embodiments.

In an exemplary embodiment, the logic 50 is configured to build and learn relationships indicative of a correlation between each variable used to determine an interest field for a geographic location visible in raw image data 17 (i.e., each pixel), and its impact on actual weather events in occurring in the same location. The logic 50 is configured to access historical weather data 91 that is indicative of measurements of a plurality of past weather events for the geographic region for which weather prediction is desired. Note that historical weather data 91 contains data for past weather events in the same location that is indicative of the same input variables used by the logic 50 to define the various interest fields when calculating a convective initiation score and lightning initiation score for each pixel as described above. Note also that the accuracy with which the logic 50 can define interest field weights and thus, generate accurate convective initiation score and lightning initiation score formulas (i.e., formulas that produce a convective initiation score and lightning initiation score that correlate closely with actual future cumulus cloud formation, precipitation and lightning in a region) generally improves as the amount of data from past weather measurements stored in historical weather data 91 for the region increases. In this regard, the logic 50 is configured to apply machine learning techniques identified above to derive weights (e.g., by generating a linear regression model or other equation) for use in calculating convective initiation and lightning initiation scores based on data indicative of the same input variables stored in historical weather data 91. Stated differently, the logic 50 uses historical weather data 91 to identify relationships that describe how weather should behave in a region under certain conditions based on how weather has behaved in the past in the same region under the same or similar conditions. Exemplary techniques for performing interest field tests and using machine learning for generating equations to be used in weather forecasting are described by U.S. Provisional Application No. 62/236,224 and U.S. application Ser. No. 15/082,744. Note that any interest field described by U.S. Provisional Application No. 62/236,224 and U.S. application Ser. No. 15/082,744 may be used by the weather forecasting logic 50 described herein to predict the occurrence of any weather event, as may be desired.

After the logic 50 determines weights associated with the convective initiation formula and lightning initiation formula for a geographic location during the training period, in an exemplary embodiment, the logic 50 is configured to generate weather forecast data 56 by defining interest fields using information stored in processed image data 55 according to the weighted convective initiation formula derived during the training period for that region. Note that the logic 50 may be configured to continually update each region's formulas by applying the same machine learning techniques previously applied during the training period described above to information the logic 50 retrieves from truth data 85 associated with the region. In the instant embodiment, the system 22 communicatively receives truth data 85 in real time during operation of the system 10, for example, via communication with a remote server (not shown) using a network (not shown) such as the Internet, but the system 22 may receive information as is stored in truth data 85 via other techniques in other embodiments. In this regard, the logic 50 is configured to apply the convective initiation formula and lightning initiation formula described above to generate weather forecast data 56 for a geographic region that is indicative of the likelihood of that a cumulus cloud will produce precipitation and lightning there.

Now, therefore, the following is claimed:

1. A lightning forecasting system, comprising:
  memory for storing satellite image data and weather data, the weather data including radar data and temperature profile data, the radar data including radar values indicating measured precipitation within a geographic region, the temperature profile data indicating atmospheric temperatures at multiple altitudes within the geographic region;
  at least one processor configured to identify a cumulus cloud object within a plurality of samples of the satellite image data, the at least one processor configured to associate portions of the weather data with the identified cumulus cloud object based on locations of the identified cumulus cloud object within the samples of the satellite image data, the at least one processor further configured to determine, based on the associated portions of the weather data, a plurality of interest fields indicating whether a cumulus cloud represented by the cumulus cloud object is likely to produce lightning in the future, wherein the plurality of interest fields include at least a first interest field and a second interest field, wherein the at least one processor is configured to identify, based on the temperature profile data, an altitude associated with a predefined temperature range and to select at least one of the radar values indicative of an intensity of precipitation within the cumulus cloud represented by the cumulus cloud object at the identified altitude, wherein the at least one processor is configured to determine the first interest field based on the at least one radar value, and wherein the at least one processor is further configured to analyze at least the first interest field and the second interest field for calculating a lightning initiation score indicating a probability that the cumulus cloud will produce lightning in the future; and
  an output interface configured to provide an output based on the lightning initiation score.

2. The system of claim 1, wherein the output includes a weather map indicating at least one geographic region where lightning is predicted to occur by the at least one processor.

3. The system of claim 1, wherein the at least one processor is further configured to determine, based on the associated portions of the weather data, a second plurality of interest fields indicating whether the cumulus cloud is likely to produce a convective storm in the future, wherein the at least one processor is configured to compare the second plurality of interest fields to predefined thresholds for calculating a convective initiation score indicating a probability that the cumulus cloud will produce a convective storm in the future, and wherein the output is based on the convective initiation score.

4. The system of claim 1, wherein the plurality of interest fields include at least a third interest field indicating whether glaciation is occurring at a top of the cumulus cloud.

5. The system of claim 4, wherein the at least one processor is configured to determine a value indicative of an infrared reflectance of the top of the cumulus cloud based on the satellite image data and to determine the third interest field based on the value.

6. A lightning forecasting method, comprising:
  storing, in memory, satellite image data and weather data, the weather data including radar data and temperature profile data, the radar data including radar values indicating measure precipitation within a geographic region, the temperature profile data indicating atmospheric temperatures at multiple altitudes within the geographic region;
  identifying, with at least one processor, a cumulus cloud object within a plurality of samples of the satellite image data;
  associating, with the at least one processor, portions of the weather data with the identified cumulus cloud object based on locations of the identified cumulus cloud object within the samples of the satellite image data;
  determining, with the at least one processor based on the associated portions of the weather data, a plurality of interest fields indicating whether a cumulus cloud represented by the cumulus cloud object is likely to produce lightning in the future, the plurality of interest fields including at least a first interest field and a second interest field;
  identifying, with the at least one processor, an altitude associated with a predefined temperature range;
  selecting, with the at least one processor, at least one of the radar values indicative of an intensity of precipitation within the cumulus cloud represented by the cumulus cloud object at the identified altitude, wherein the first interest field is determined based on the selected at least one radar value;
  analyzing, with the at least one processor, at least the first interest field and the second interest field;
  calculating, with the at least one processor based on the analyzing, a lightning initiation score indicating a probability that the cumulus cloud will produce lightning in the future; and
  providing an output based on the lightning initiation score with an output interface.

7. The method of claim 6, wherein the output includes a weather map indicating at least one geographic region where lightening is predicted to occur based on the lightning initiation score.

8. The method of claim 6, further comprising:
determining, with the at least one processor based on the associated portions of the weather data, a second plurality of interest fields indicating whether the cumulus cloud is likely to produce a convective storm in the future;
comparing the second plurality of interest fields to predefined thresholds; and
calculating, with the at least one processor based on the comparing the second plurality of interest fields, a convective initiation score indicating a probability that the cumulus cloud will produce a convective storm in the future,
wherein the output is based on the convective initiation score.

9. The method of claim 6, wherein the plurality of interest fields include at least a third interest field, and wherein the third interest field indicates whether glaciation is occurring at a top of the cumulus cloud.

10. The method of claim 9, further comprising:
determining, with the at least one processor, a value indicative of an infrared reflectance of the top of the cumulus cloud based on the satellite image data; and
determining, with the at least one processor, the third interest field based on the value.

11. The method of claim 9, further comprising:
determining, with the at least one processor, a value indicative of a difference in infrared reflectance of the top of the cumulus cloud based on the samples of the satellite image data;
comparing the difference to a predefined threshold; and
determining, with the at least one processor, the third interest field based on the comparing.

12. The system of claim 4, wherein the at least one processor is configured to determine multiple values indicative of infrared reflectance of the top of the cumulus cloud based on the samples of the satellite image data, wherein the at least one processor is configured to determine a difference in the multiple values of the infrared reflectance over multiple ones of the samples of the satellite image data, and wherein the at least one processor is further configured to determine the third interest field based on a comparison of the difference to a predefined threshold.

* * * * *